United States Patent [19]

Messina et al.

[11] 4,439,570

[45] Mar. 27, 1984

[54] PHENOLIC ANTIOXIDANT COMPOSITIONS FOR ORGANIC POLYMERS

[75] Inventors: Giuseppe Messina, Alghero; Loreno Lorenzoni, Porto Torres; Antonio L. Fadda, Sassari, all of Italy

[73] Assignee: Euteco Impianti S.p.A., Milan, Italy

[21] Appl. No.: 424,766

[22] Filed: Sep. 27, 1982

[30] Foreign Application Priority Data

Oct. 20, 1981 [IT] Italy .............................. 24576 A/81

[51] Int. Cl.$^3$ .............................................. C08K 5/50
[52] U.S. Cl. ................................. 524/154; 524/343; 524/349; 524/350; 252/400 A; 252/404
[58] Field of Search ............... 524/115, 154, 343, 349, 524/350; 252/400 A, 404

[56] References Cited

U.S. PATENT DOCUMENTS

| 3,255,151 | 6/1966 | Hecker et al. | 524/154 |
| 3,408,308 | 10/1968 | Waterman et al. | 260/815 |
| 3,962,123 | 6/1976 | DiBattista et al. | 524/300 |
| 3,962,179 | 6/1976 | Chen | 524/154 |

FOREIGN PATENT DOCUMENTS 1357937 2/1964 France .

*Primary Examiner*—Veronica P. Hoke
*Attorney, Agent, or Firm*—Birch, Stewart, Kolasch & Birch

[57] ABSTRACT

Substantially colorless, liquid compositions are described which are constituted by a phenolic antioxidant, or mixture of phenolic antioxidants, and at least one phosphine, the compositions being highly resistant to coloration phenomena.

These compositions are effective stabilizers for organic polymers and, when incorporated in the said polymers, have a stabilizing power which is greater than that shown by the phenolic antioxidant or mixture of phenolic antioxidants alone.

5 Claims, No Drawings

PHENOLIC ANTIOXIDANT COMPOSITIONS FOR ORGANIC POLYMERS

BACKGROUND AND FIELD OF THE INVENTION

The present invention relates to phenolic antioxidant compositions having improved characteristics as regards their resistance to coloration and their ability to stabilize organic polymers, such as rubbers and plastics materials in general. The invention also relates to the use of the said antioxidant compositions for stabilizing the said organic polymers.

The use of substances having stabilizing characteristics, particularly antioxidants, is known in the production and/or working of rubbers and plastics materials in general. In the preparation of these organic polymers, and during their conversion, degradation phenomena may occur as a result of the oxygen in the air, light and/or the working temperature, with consequent undesired variations in the rheological properties of the polymers themselves. In particular, oxidation may occur which, as a final result, brings about the breakage of the polymeric chain with consequent diminution in the viscosity, average molecular weight, flexibility or resilience of the polymer.

In order to avoid these disadvantages, it is usual to add particular substances which can act as antioxidant stabilizers either during the polymerization reaction which results in the formation of the polymer and/or to the polymer formed and/or during the working to which the polymer is subjected to convert it into manufactured articles. For this purpose phenols are particularly effective in which the phenolic hydroxyl group is sterically hindered by the presence of voluminous substituents on the ring. These phenols in fact have the capacity to retard the oxidation by acting as radical inhibitors.

The said phenolic antioxidants have an undesirable tendency to coloration, although to different degrees. In time they in fact tend to yellow or take on other colour tones and this is a disadvantage in that the colour is transmitted to the organic polymers which are intended to be stabilized. Thus, for example, in the case of the production of SBR rubbers (styrene-butadiene) and ABS rubbers (acrylonitrile, butadiene and styrene) the tendency to coloration of phenolic antioxidant emulsions which are added to the rubber latex before coagulation is particularly undesirable as is also the tendency of organic polymers in general to become coloured during their working at high temperatures.

In order to avoid these disadvantages it is usual in the art to add specific substances to the phenolic antioxidants or their emulsions which are able to improve the resistance of the antioxidants themselves to coloration. Thus, according to Japanese Pat. No. 7230897 of the Aug. 10, 1972, sodium formaldehyde sulphoxylate is used as a colour stabilizer for aqueous emulsions of phenolic antioxidants of the type 2,6-di-tertbutyl-4-methylphenol. According to U.S. Pat. No. 3,887,447, a hydrazine is used for this purpose in combination with phenolic antioxidants of the type 2,4-ditert-butyl-4-nonylphenol. Other substances used in the art are derivatives of hydroxylamine, such as the oximes and alkylhydroxylamines.

The use of said substances to confer resistance to coloration on the antioxidants does not always give satisfactory results. Indeed, they display their effect in rather high concentrations in the phenolic antioxidants or are not soluble in the said antioxidants, which limits their use, for example, solely to aqueous emulsions of the antioxidants. Finally, none of these added substances improves the stabilizing effect of the phenolic antioxidant on the organic polymers to which they are added.

DETAILED DESCRIPTION OF THE INVENTION

According to the present invention it has now been found that phosphines may be used successfully to prevent the coloration of phenolic antioxidants and that their effect is manifested even at extremely small concentrations of the phosphines in the phenolic antioxidant with which they are combined. it has also been found that the phenolic-phosphine antioxidant compositions have greater stabilizing effects on organic polymers than is realized by the phenolic antioxidant alone.

Accordingly, the present invention relates to a composition resistant to coloration and suitable for stabilizing organic polymers towards the deleterious effects of oxygen, light and heat, which is constituted by a substantially colourless, liquid mixture of at least one phosphine and a phenolic antioxidant or mixture of phenolic antioxidants.

Phosphines which are useful for the purposes of the present invention are those represented by the following general formula:

in which:
R₁ represents an alkyl group with from 3 to 20 carbon atoms, a cyclo-alkyl group, an aryl group, or an aryl group substituted with one or more alkyl groups having from 1 to 20 carbon atoms;
R₂ and R₃ are hydrogen or have the same significance as R₁.

The phosphines which are preferred for the purposes of the present invention are tertiary phosphines in which R₁, R₂ and R₃ represent an alkyl group with from 3 to 20 carbon atoms or the phenyl group. Examples of the preferred phosphines are triphenylphosphine, tributylphosphine and trioctylphosphine.

The phenolic antioxidants which are combined with the phosphines in the compositions of the present invention are those which are sterically hindered and are generally obtained by the alkylation of phenol, or a methylene bisphenol, with olefins which may be mixtures such as: isobutylene, alphamethylstyrene, cyclopentene, diisobutylene, nonenes, etc. Specific examples of these phenolic antioxidants are:
2,6-di-tert-butyl-4-methylphenol,
2,6-di-tert-butyl-4-cumylphenol,
2,6-di-tert-butyl-4-nonylphenol,
2,6-dicumylphenol,
2,6-di-tert-butyl-4-isooctylphenol,
4,4'-methylene-bis(2,6-di-tert-butylphenol),
2,2'-methylene-bis(4-methyl-6-tert-butylphenol).

It is not necessary for the phenolic antioxidant to be pure, and indeed it is possible to use antioxidant mixtures obtained, for example, by means of the alkylation processes mentioned above containing the phenol with various degrees of substitution.

Examples are:

mixtures of di- and tri- styrenated phenols with the styrene groups in the 2,6 and 2,4,6-positions respectively, obtained by the alkylation of phenols with styrene or alpha-methylstyrene;

mixtures of the products of the alkylation of phenols with isobutylene or di-isobutylene;

mixtures of the products of the alkylation of phenols with alpha-methylstyrene and isobutylene in which the cumyl radical is mainly in the 4-position and the tert-butyl radical is in the 2-position;

mixtures of the products of the mono- and ditert-butylation of nonylphenol.

The compositions of the present invention may generally contain phosphine or mixtures of phosphines, in quantities of from 100 to 10,000 ppm by weight. Concentrations higher than 10,000 ppm may obviously be used but no appreciable advantages are obtained. The effect of the phosphines is manifested at concentrations even as low as 100 to 2,000 ppm by weight, in respective compositions.

There are many advantages in the use of phosphines in the compositions with the phenolic antioxidants, such as:

they give the phenolic antioxidant compositions a great resistance to coloration even at very low concentrations;

they are soluble in the phenolic antioxidants and may hence be mixed directly with these antioxidants;

they prevent even the partial crystallization of those phenolic antioxidants which have a tendency to crystallize at ambient temperatures; and they improve the colour of phenolic antioxidant compositions in which they are incorporated.

The antioxidant compositions of the present invention are useful for stabilizing rubbers and plastics materials in general towards degradative phenomena caused by oxygen, light and heat. Specific examples of organic polymers which are stabilized are: styrene-butadiene rubbers (SBR), acrylonitrile-butadiene-styrene rubbers (ABS), polybutadiene, high density polyethylene, low density polyethylene and polystyrene.

The compositions of the present invention may be used as such, or in the form of aqueous emulsions, and according to the requirements of the method of use, may be added in an amount of from 0.1 to 10 parts by wt. to 100 parts of polymer during the preparation of the organic polymer, to the polymer which has already been formed or during working of the polymer to convert it into manufactured articles. A typical application consists of the addition of the phenolic—phosphine antioxidant composition to the SBR rubber latex in a step immediately preceding that of coagulation of the latex itself.

In each case, the stabilization effects shown by the compositions of the present invention are greater than those which can be achieved by the phenolic antioxidant alone, which results from a synergistic effect exerted by the mixture.

The examples which follow are illustrative and non-limiting of the invention.

EXAMPLE 1

A liquid antioxidant mixture is used which is constituted by:

| | |
|---|---|
| 4-cumyl-2-tert-butylphenol | 15% by weight |
| 4-cumyl-2,6-di-tert-butylphenol | 30% by weight |
| mono- and di-tert-butylated 2-cumylphenol | 5% by weight |
| saturated dimer of alpha-methylstyrene | 25% by weight |
| 2,6-di-tert-butyl- and 2,4,6-tri tert-butylphenol | 15% by weight |
| other compounds | 10% by weight |

To 25 g of this antioxidant mixture heated to 75°–80° C. and maintained under strong agitation is added an emulsion of 5.9 g of a soap known commercially as Aerosol A/196 in 152 ml of water. The mixture is agitated vigorously for 10 minutes to form a stable emulsion of the antioxidant mixture.

The emulsion obtained is divided into two parts which are placed in two 150 ml glass beakers. To one of the two samples obtained is added 1% by weight of aqueous sulphuric acid to bring the pH to 3.5.

The two beakers are placed in a bath controlled thermostatically to 50° C., their contents are maintained under agitation and the colour of the two samples is observed with time.

The non-acidified sample, which was originally white, yellows in about 8 hours and after about 24 hours takes on an intense yellow-green colour.

The acidified sample which was originally white, yellows in about 4 hours and takes on an intense yellow colour after 24 hours.

The test is repeated using a substantially-colourless liquid, composition formed from the antioxidant mixture and triphenylphosphine, containing 500, 1,000, 2,000, 5,000 and 10,000 ppm of triphenylphosphine. All the emulsified samples, whether acidified or not, keep their initial white colour after heating for 48 hours at 50° C.

EXAMPLE 2

The antioxidant mixture described in example 1 (100 g) is placed in a glass bottle, in which it is maintained hermetically sealed under nitrogen. The bottle is kept under ambient conditions (20° to 25° C.) and after three days it is seen that the antioxidant mixture starts to crystallize and after 2 months becomes partially solid with a yellow-green colouration.

The first part of this example is repeated with the addition to the antioxidant mixture of 1,000 ppm of triphenylphosphine. After 2 months conservation under ambient conditions (20° to 25° C.) no appreciable colour variation nor any crystallization is noted. The mixture keeps its substantially-colourless, clear, liquid appearance.

The first part of this example is repeated with the use of the commercial, stabilized antioxidant Wingstay T.

After two months conservation under ambient conditions the mixture is semi-solid and slightly yellow in colour.

EXAMPLE 3

A liquid antioxidant mixture is used which is constituted by:

| | |
|---|---|
| olefins (dimers of isobutylene) | 4.8% by weight |
| phenolic ethers | 7% by weight |
| 2,6-di-tert-butyl-4-isooctylphenol | 15.3% by weight |
| 2-tert-butyl-4-isooctylphenol | 34% by weight |
| 2- and 4-isooctylphenol | 15% by weight |
| 2,4-diisooctylphenol | 16% by weight |

-continued

| other compounds to bring to | 100% by weight |
|---|---|

An aqueous emulsion of this antioxidant mixture is prepared and one part of the emulsion obtained is acidified exactly as described in example 1.

The test for stability of colour of the acidified emulsion and of the non-acidifed emulsion of the antioxidant mixture is carried out as explained in example 1 and gives the following results:

| Non-acidified emulsion | | | |
|---|---|---|---|
| time | 0 | colour | white |
| time | 2 hours | colour | white |
| time | 5 hours | colour | white |
| time | 8 hours | colour | white |
| time | 24 hours | colour | creamy-white |
| Acidified Emulsion | | | |
| time | 0 | colour | white-blue |
| time | 2 | colour | white-blue |
| time | 5 | colour | white-blue |
| time | 8 | colour | white-green |
| time | 24 | colour | white-green |

The test is repeated with the use of a substantially-colourless, liquid composition formed from the antioxidant mixture and triphenylphosphine with 1,000 ppm of triphenylphosphine. The initial colour of both the emulsified samples (acidified and non-acidified) remains unaltered at the end of 24 hours of the test for the stability of colour.

EXAMPLE 4

A liquid antioxidant mixture is used which is constituted by:

| olefins | 8% by weight |
|---|---|
| 2,4,6-tributylphenol | 4% by weight |
| saturated dimer of alpha-methylstyrene | 30% by weight |
| 4-cumyl-2,6-di-tert-butylphenol | 29% by weight |
| 4-cumyl-2-tert-butylphenol | 18% by weight |
| other cumylphenols | 2% by weight |
| other compounds | 100% by weight |

An aqueous emulsion of this antioxidant mixture is prepared exactly as described in example 1. The aqueous emulsion obtained is acidified and subjected to the stability of colour test described in example 1.

The acidified emulsion, initially white, yellows after 4 hours.

The test is repeated with the use of a substantially-colourless, liquid composition, constituted by the antioxidant mixture and triphenylphosphine, containing 1,000 ppm of triphenylphosphine. The acidified emulsion of this composition keeps its initial white colour after 24 hours of the test for colour stability.

EXAMPLE 5

An emulsion is prepared from the substantially-colourless, liquid composition constituted by the antioxidant mixture of example 4 and triphenylphosphine (1,000 ppm), in the manner described in example 1. The emulsion is added to a SBR 1,500 rubber latex in quantities of 1.25 parts by weight per 100 parts by weight of the dry rubber. The coagulation is carried out in the presence of sodium chloride/sulphuric acid. The coagulated rubber is subjected to an accelerated ageing test in an oven with an air circulation at 100° C. In parallel, a test identical to the previous one is carried out with the use of the stabilized, commercial antioxidant Wingstay T.

The results obtained are given in the following table:

| | Control | | Example 5 | |
|---|---|---|---|---|
| Ageing time (hours) | Mooney Viscosity | Gels (%) | Mooney Viscosity | Gels (%) |
| 0 | 62 | — | 64 | — |
| 6 | 67 | — | 72 | — |
| 12 | 71 | — | 73 | — |
| 24 | 72 | 0.26 | 74.5 | — |
| 48 | 77 | 0.66 | 79 | 0.52 |

The values obtained in the case of Example 5 are completely satisfactory as are also the colour of the rubber as such and during ageing.

EXAMPLE 6

To an SBR 1,500 rubber latex is added an antioxidant emulsion in quantities of 1.25 parts by weight per 100 parts by weight of dry rubber.

The latex is then coagulated in the presence of sodium chloride/sulphuric acid. The coagulated rubber (400 g) is combined with sulphur (7 g), carbon black (200 g), stearic acid (4 g), N-tert-butyl-2-benzothiazyl sulphonamide accelerant (4 g) and zinc oxide (12 g). The rubber is then vulcanized at 145° C.

More particularly, four series of tests are carried out with the following antioxidant emulsions:

(A) Emulsion of the antioxidant mixture of example 3 without stabilizer;
(B) Emulsion of the commercial, stabilized antioxidant Wingstay T;
(C) Emulsion of the composition constituted by the antioxidant of example 3 and 1,000 ppm of triphenylphosphine;
(D) Emulsion of the composition constituted by the antioxidant of example 3 and 6,000 ppm of triphenylphosphine.

The tests are carried out according to the standard ISO 23222-1975 (F) method, with the rheometric tests carried out by means of a Monsanto Rheometer with an oscillating disc and with:

$V_{min}$—minimum couple in lb.f.in (pound.foot.inch)
$V_{10}$—couple after 10' lb.f.in.
$V_{15}$—couple after 15' lb.f.in.
$V_{max}$—maximum couple in lb.f.in.

The times $T_{10}$, $T_{50}$, $T_{90}$, $T_2$, $TC_{90}$ are found from the rheometric curve on the basis of the values of $V_{min}$ and $V_{max}$.

The modules at 25', 35', 50' (in Kg/cm$^2$) are determined with an Instron dynamometer, from sheets obtained by vulcanizing the mixture obtained according to the ISO method indicated above.

The results are given in the following table:

| | A | B | C | D |
|---|---|---|---|---|
| Viscosity: ML (1 + 4) 100° C. | 49 | 50 | 51 | 52 |
| "Mooney Compound" | 70 | 71 | 74 | 76 |
| $V_{min}$ | 10.2 | 10.2 | 11.9 | 11.75 |
| $V_{10}$ | 28.5 | 29.4 | 32.5 | 32.85 |
| $V_{15}$ | 39.6 | 41.0 | 43.3 | 42.65 |
| $V_{max}$ | 43.8 | 45.3 | 46.8 | 45.5 |
| $T_{10}$ (minutes) | 5.95 | 6.0 | 6.45 | 6.22 |
| $T_{50}$ | 9.67 | 9.6 | 9.35 | 9.07 |
| $T_{90}$ | 15.75 | 15.75 | 15.0 | 14.22 |

-continued

|  | A | B | C | D |
|---|---|---|---|---|
| $T_2$ | 5.5 | 5.5 | 5.5 | 5.42 |
| $TC_{90}$ | 14.8 | 14.85 | 14.0 | 13.57 |
| 25' | 115 | 122 | 148 | 148 |
| 35' | 161 | 173 | 196 | 187 |
| 50' | 190 | 194 | 214 | 201 |
| CR (35') | 251 | 278 | 288 | 282 |
| AR (35') | 460 | 480 | 420 | 440 |

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

We claim:

1. Heat resistant composition suitable for stabilizing styrene-butadiene rubbers, acrylonitrile-butadiene-styrene rubbers or polybutadiene against the deleterious effects of oxygen, light and heat, consisting essentially of a substantially-colourless liquid mixture of a phenolic antioxidant or mixture of phenolic antioxidants selected from the group consisting of the products of the alkylation of phenol or a methylene bisphenol with isobutylene, alpha-methylstyrene, cyclopentene, diisobutylene and nonenes or mixtures thereof; and from 100 to 10,000 ppm by wt. of a phosphine selected from the group consisting of triphenylphosphine, tributylphosphine and trioctylphosphine.

2. A composition according to claim 1, wherein the amount of the said phosphine is from 100 to 2,000 ppm by wt.

3. Compositions of styrene-butadiene rubbers, acrylonitrile-butadiene-styrene rubbers or polybutadiene comprising of 0.1 to 10 parts by wt. of a composition according to claim 1 or 2 based on 100 parts by wt. of polymer.

4. Compositions of styrene-butadiene rubbers or acrylonitrile-butadiene-styrene rubbers comprising from 0.1 to 10 parts by wt. of a composition according to claims 1 or 2 based on 100 parts by wt. of polymer, said composition having been added to the latices of the said rubbers before coagulation.

5. A heat resistant composition according to claim 1, wherein the liquid mixture is present in the form of an aqueous emulsion.

* * * * *